United States Patent
Vagati

[19]

[11] Patent Number: 5,818,140
[45] Date of Patent: Oct. 6, 1998

[54] SYNCHRONOUS RELUCTANCE ELECTRICAL MOTOR HAVING A LOW TORQUE-RIPPLE DESIGN

[76] Inventor: Alfredo Vagati, Corso Matteotti 19, I-10078 Venaria (Torino), Italy

[21] Appl. No.: 671,653

[22] Filed: Jun. 28, 1996

[30] Foreign Application Priority Data

Jul. 11, 1995 [IT] Italy .................................. TO95A0581

[51] Int. Cl.⁶ .......................... H02K 19/26; H02K 21/00; H02K 23/02
[52] U.S. Cl. .......................... 310/185; 310/152; 310/163; 310/211; 310/261
[58] Field of Search .................................. 310/185, 152, 310/261, 211, 163

[56] References Cited

U.S. PATENT DOCUMENTS

| | | | |
|---|---|---|---|
| 3,671,789 | 6/1972 | Menzies | 310/163 |
| 3,678,436 | 7/1972 | Herdrich et al. | 335/284 |
| 3,679,924 | 7/1972 | Menzies | 310/163 |
| 3,758,800 | 9/1973 | McLaughlin | 310/211 |
| 4,358,697 | 11/1982 | Liu et al. | 310/156 |
| 4,663,551 | 5/1987 | Weh et al. | 310/152 |
| 4,888,513 | 12/1989 | Fratta | 310/216 |
| 4,924,130 | 5/1990 | Fratta | 310/261 |

OTHER PUBLICATIONS

Vagati, A., "The Synchronous Reluctance Solution: A New Alternative in A.C. Drives", *Proceedings of the IECON '94*, 1994, pp. 1–11.

*Primary Examiner*—Steven L. Stephan
*Assistant Examiner*—Elvin G. Enad
*Attorney, Agent, or Firm*—Young & Thompson

[57] ABSTRACT

A synchronous reluctance electrical motor, including a stator having an even number of slots per pair of poles equal to $n_s$, a rotor of the transverse lamination type having an even number $n_r$ of equivalent slots per pair of poles, and an air gap separating the stator from the rotor, wherein, in order to minimize the torque ripple, between the number $n_s$ of the stator slots and the number $n_r$ of the rotor equivalent slots the following relationships are satisfied: $n_s - n_r \neq 0, +2, -2$; $n_r > 6$; $n_s \neq m \cdot n_r$, m being an integer, and preferably also the following relationship: $n_s - n_r = \pm 4$. The rotor of this motor may have insulating layers open to the air gap and/or insulating layers closed towards the air gap by iron ribs suitable for being magnetically saturated; other iron ribs may traverse some insulating layers in intermediate positions thereof. Preferably the rotor layers are designed with constant permeance, in order to avoid producing harmonics capable of interacting with harmonics produced by the stator windings.

10 Claims, 2 Drawing Sheets

5,818,140

1

SYNCHRONOUS RELUCTANCE ELECTRICAL MOTOR HAVING A LOW TORQUE-RIPPLE DESIGN

BACKGROUND OF THE INVENTION

This invention concerns an electrical motor of the synchronous reluctance type.

The synchronous reluctance electrical motors are particularly suitable or electronically controlled drives, and they are generally driven by vector control of the motor currents. The current vector is set synchronous to the rotor by an electronic modulated inverter, according to the information produced by an angular position sensor solid with the motor shaft.

In order to get a performance comparable to that of competing a/c motors (induction motors, permanent magnet synchronous motors), the synchronous reluctance motor must exhibit a high rotor anisotropy. By reference to a two-pole machine, the rotor must show two symmetry axes whose magnetic behavior must be very different: the d-axis (direct), showing very large permeance, and the q-axis (quadrature), showing very low permeance.

This can be obtained in practice by two different types of designs, well known to those who are skilled in the art: the motor having an axially laminated rotor, and the motor having a conventional transversely laminated rotor, the latter motor having by a stack of flat cut laminations of proper shape. In both cases the rotors behave magnetically as a set of ferromagnetic segments, whose magnetic potentials can be different from each other. In the axially laminated rotor the number of such segments is very large, and preferably, larger than the number of stator teeth. On the contrary, in the transversely laminated rotor the number of such segments is comparable to the stator teeth number.

The ferromagnetic segments are mutually separated by non-magnetic layers. In the axially laminated rotor these layers reach the air gap. In the transversely laminated rotor these layers may reach the air gap or, alternatively, the ferromagnetic segments can be physically connected to each other by thin ribs, directly obtained from cutting. These ribs are set in the proximity of the air gap, but other ribs may be present elsewhere. This type of design gives mechanical strength to the rotor stack, in an easy and cheap way. On the other hand, when ribs are adopted, the anisotropic behavior is only obtained once the ribs are magnetically saturated by a flux aligned to the quadrature axis.

The present invention concerns the type of motors having a transversally laminated rotor, which is certainly the most suitable for the industrial manufacture.

Usually, when this type of motor is adopted, the ferromagnetic segments are regularly spaced in order to identify a constant pitch at the air gap. This rotor pitch can be defined by the distance, measured at the air gap, between two adjacent insulating layers. When ribs are adopted, the rotor pitch is defined by the distance between two adjacent ribs.

In addition, it is a common practice to design the rotor pitch equal to the pitch of the stator slots. This is in order to average, in the rotor iron in proximity of the air gap, the local flux density oscillations produced by the stator teeth, thus preventing their propagation along the segments into the inner rotor iron. In this way, the iron losses in the rotor are consistently reduced. These losses can be quite large, as in the case of an axially laminated rotor having a large segment number.

On the other hand, this "equal-pitch" design enhances the torque ripple, even in case of ideal (sinusoidal) current

2 supply. In fact, the torque is produced by the interaction between the impressed currents $i_d$, $i_q$ and the flux linkage $f_d$, $f_q$. Due to the interaction between stator and rotor teeth, $f_d$ and $f_q$ become also functions of the rotor angle θ. To reduce this torque ripple, a measure commonly adopted in the electrical machines is to mutually skew the stator or rotor laminations by an angle equal to the stator pitch. For the synchronous reluctance motor, however, this measure cannot completely eliminate the ripple, even in theory. Anyway, a consistent reduction of ripple is obtained; however, this reduction can be insufficient for high performance applications. In addition, a measure capable of inherently reducing the torque ripple by means of the design of laminations should be welcome also in low performance applications. In fact, in this case, the skewing could be avoided or replaced by simpler and cheaper measures,

SUMMARY OF THE INVENTION

Therefore, the main object of this invention is to provide an electrical reluctance motor having a transversely laminated rotor whose torque ripple is consistently reduced with respect to the state of the art, irrespective of other conventional measures, such as the skewing or other equivalent means.

Another object of this invention is to realize this reduction of torque ripple without enhancing additional iron losses.

The basics of this invention come from some considerations, which are reported in the following, before entering specifically into the contents of the invention.

(A) The discretization of the stator and the rotor is inherent to the machine structure. For the stator, it depends on the allocation of the conductors in equally spaced slots. In theory, it is possible to allocate the conductors in such a way as to eliminate all higher order harmonics, except those related to the slot number. For the rotor, the discretization is inherent to the choice of the transverse (traditional) lamination, as above discussed.

By reference to the most frequent case of a three-phase machine, naming p the number of pairs of poles, q the number of stator slots per pole and per phase and $n_s$ the number of stator slots per pair of poles, the total number $N_s$ of stator teeth will be $N_s=n_s \cdot p=6 \cdot q \cdot p$.

For the rotor the situation is more complicated, because a relationship must be found between the number n of segments per pair of poles and the number $n_r$ of equivalent teeth per pair of poles.

As an example, we can refer to FIGS. 1 and 2, in which two different configurations are shown, both referring to a rotor discretized in eight steps. The case p=1 (one pair of poles) is shown. In FIGS. 3 and 4, the ideal behavior of the rotor magnetic potential is shown too, as produced by a q-axis excitation (magnetomotive force=m.m.f.).

The separation points between segments (ribs) are evidenced each one by a small circle or by a small cross. A circle is used to show a real separation point, whereas a cross is adopted to show a virtual separation point, which is not related to any step of the rotor magnetic potential. However, in both cases the harmonic content of such potentials is of the order $k \cdot n_r \pm 1$, with k being any positive integer, $n_r$ being the number of equivalent teeth (or equivalent slots), which is equal to the number of real or virtual separation points (ribs).

The number $n_r$ must be even, for reasons of symmetry. The two shown cases differ because of the different relationship between $n_r$ and the number n of segments per pair of poles. When the d-axis is non-magnetic (FIG. 1), virtual ribs are present and the relationship $n_r=2 \cdot n$ holds. In the other case (FIG. 2), the relationship $n_r=2(n-1)$ is valid. This latter case is more suitable for the practical realization, because the shaft embedding is easier.

(B) Theoretically, the above discussed discretization could be independent of the modulation of the air gap permeance (closed slots). In practice, however, the stator slots are open and the rotor ribs behave magnetically as open when they are saturated by the torque-generating m.m.f. component. Thus, the interaction between the stator toothing and the equivalent rotor toothing produces a modulation of the air gap permeance, as a function of angle θ between rotor and stator.

(C) An exhaustive analysis of this phenomenon is unfeasible. It would simultaneously account for discretization and permeance modulation, when both d and q m.m.f.s are present and taking into account the magnetic saturation. This one also causes a magnetic cross-coupling between the d and q axes. As a consequence, the $f_q$ and $f_d$ fluxes are, in general, non-linear functions of both d and q currents, together with the angle θ between rotor and stator, that is: $f_d(i_d, i_q, \theta)$, and $f_q(i_d, i_q, \theta)$.

However, it is possible to consider separately and in an approximate way the two simplest situations, that is d-axis and q-axis excitations. Then the result may be extended to the general case on the basis of intuitive considerations.

(D) When a q-axis m.m.f. is applied, the rotor reacts by a magnetic potential distribution whose first harmonic nearly balances the applied m.m.f. A slight difference is due to the flux flowing through the rotor non-magnetic layers. Anyway, a ripple on the flux-linkage $f_q$ is produced. This ripple is due to interaction between the stator slot harmonics and the harmonics of the rotor magnetic potential, as defined above.

(E) On the contrary, when a d-axis m.m.f. is applied, the rotor reacts in a very limited way. As a consequence, the stator discretization does not produce alone, any appreciable ripple on the $f_d$ flux linkage. On the contrary, a relevant $f_d$ ripple arises when a modulation of the air gap permeance is considered, as produced by the openings of the stator slots and the equivalent rotor slots. This ripple, for p=1, is nearly proportional to the following relationship (1), where φ is an angular coordinate along the rotor surface:

$$\int_{-\pi}^{\pi} \cos^2 \psi \cdot \cos k n_r \psi \cdot \cos h n_s(\psi + \vartheta) \cdot d\psi \quad (1)$$

This invention has been developed starting from considerations from (A) to (E).

By reference to (D) and (E), the invention preliminary suggests that the following condition (2) holds, where h and k are any positive integer:

$$h \cdot n_s \pm 1 \neq k \cdot n_r \pm 1 \quad (2)$$

It is assumed advantageous that condition (2) is valid in general, also when both d and q axis of a real machine are simultaneously excited. As explained in (C), the practical situation is much more complex and the principle of the effects superposition cannot be invoked, in this case.

On the other hand, condition (2) cannot be verified for every harmonic order. It is at least desirable that condition (2) is verified for k=h=1. In this case the condition (2) becomes:

$$n_s \pm 1 \neq n_r \pm 1.$$

This is not true in the current practice of the state of art, because $n_s=n_r$ is generally posed in order to avoid additional iron losses in the rotor, as above told.

Regarding these losses, the invention postulates that the additional losses are still acceptable, for a practical design, even if $n_s \neq n_r$ is posed. This is assumed to be true until the rotor pitch becomes equal to or lower than the opening of the stator slots.

Moreover, both $n_s$ and $n_r$ must be even, in a synchronous reluctance motor, as above discussed. Thus, the application of this invention requires that at least the following condition (3) holds:

$$n_s - n_r \neq 0, +2, -2 \quad (3)$$

It is to be remarked that $n_s$ and $n_r$ should not be much different from each other. In fact, once $n_s$ is given, values of $n_r$ increasingly lower lead to low anisotropy of the motor, because of the zig-zag fluxes flowing across the air gap. Moreover, for $n_r \leq 6$ the relationship $k \cdot n_r \pm 1$ produces all odd harmonics which are present in the m.m.f., thus excluding any harmonic selection.

On the other hand, once $n_s$ and consequently the stator pitch is given, an increasingly lower rotor pitch will enhance the rotor iron losses, as told, and also induce local saturation phenomena in the rotor iron, depending also on the stator slot openings.

A further consideration concerns the different harmonic content of stator permeance (teeth) and rotor permeance (segments). Since the rotor slot opening (ribs) is generally lower than the stator one, the rotor permeance should contain more high order harmonics than the stator permeance. As a consequence, with reference to relationship (2), it seems opportune to exclude those $n_r$ numbers which are submultiple of $n_s$, that is, to avoid rotor pitches which are multiple of the stator pitch. Anyway, this is relevant only when $n_s \geq 24$, because $n_r > 6$ and $n_s$ is a multiple of 6.

In conclusion, a valid but simple criterion is found in relationship (4), with the just described limitations ( $n_r>6$; $n_s \pm m \cdot n_r$; m integer):

$$n_s = n_r \pm 4 \quad (4)$$

However, it must be observed that the rotor iron losses depend on $n_r$ in a very complex way. Thus, it cannot be excluded that some $n_r$ values not satisfying relationship (4) but included into relationship (3) could be desirable in the practice.

A further consideration regards the synergy, in reducing the torque ripple, of the above described measures with the design of the inner rotor, that is, the shape of the rotor insulating layers. Each layer is inserted between two adjacent ferromagnetic segments whose magnetic potential is different (saturated ribs). Thus, a permeance value can be associated to each layer.

It is known from the literature (for example: Proceedings of IECON '94, Bologna, May 9, 1994, Vol. 1, p. 1, A. Vagati: "The synchronous reluctance solution: a new alternative in AC drives"), that a complete rotor whose layers have the same permeance (constant permeance) reacts to a sinusoidal quadrature excitation without adding harmonics other than the first and those of the orders $k \cdot n_r \pm 1$ here considered. If the rotor is incomplete (e.g., one layer missing), some additional harmonics are generated, but they can be minimized by a proper distribution of layer permeance. As a consequence, it is opportune that the rotor of a synchronous reluctance motor characterized by low torque ripple is designed following the "constant permeance" criterion or an equivalent measure, when incomplete. In addition, this generally increases the anisotropy ratio, as known.

Another, practical consideration is due at this point. Once $n_r$ is chosen according to this invention, it can be difficult in practice to realize the layer on the d-axis (FIG. 1) or the little ferromagnetic segment across the q-axis (FIG. 5). Failing to observe it, of course, increases the torque ripple. However, this increase is limited, because only a small portion of the rotor is modified. As a consequence, the so modified rotors must still be considered as having $n_r$ rotor slots, even if some ribs are missing. On the other hand, the implementation of this invention is unambiguous in such case, because the adopted $n_r$ number can be detected from the rotor pitch, which is constant on the main part of the air gap.

In an analogous way, sometimes it is acceptable for there to be a cut-off across the quadrature axis.

A last consideration regards the possible presence of internal ribs, in addition to those at the air gap. This is related to mechanical problems: anyway, the magnetic behavior is independent from the physical position of the rib.

The above discussion refers to 2-pole machines ($N_s=n_s$, $N_r=n_r$) Of course, its validity is unaffected when p-pole machines are considered ($N_s=p \cdot n_s$, $N_r=P \cdot n_r$) The results of the discussion could also be extended in the proper way to a phase number different from three.

In conclusion, it can be stated that the reduction of the torque ripple (with respect to the usual case $n_r=n_s$) due to adoption of the above discussed measures is certainly relevant. It is very difficult to give an exact estimate, because too many factors are involved. However, it can be foreseen that, set to 1 the torque ripple when $n_s=n_r$, the implementation of this invention will lead to a torque ripple lower than 0.2 to 0.3.

Summing-up, the object of this invention is reached by a synchronous reluctance electrical motor, including a stator having an even number of slots per pair of poles equal to $n_s$ and a rotor of the transverse lamination type having an even number $n_r$ of equivalent slots per pair of poles, characterized in that, in order to minimize the torque ripple, between the even $n_s$ number and the even $n_r$ number the following relationships must be satisfied: $n_s-n_r \neq 0$, +2, -2; $n_r>6$, $n_s \neq m \cdot n_r$, m being an integer.

Preferably, the following relationship between $n_s$ and $n_r$ as above defined should be verified: $n_s-n_r = \pm 4$.

In the synchronous reluctance motor according to the invention, the rotor can show insulating layers open to the air gap, or these layers can be closed in the proximity of the air gap by iron ribs, to be saturated magnetically.

Again, the rotor can show some layers open to the air gap and other layers closed towards the air gap by iron ribs. In addition, other ribs can be present in various number and various different positions.

To avoid additional harmonics, which can interact with those produced by the stator windings, the insulating layers of the synchronous reluctance motor according to the invention are preferably realized by constant permeance, that is, the ratio between length and width of each layer is nearly equal for all the rotor layers.

The indications given above have a theoretical value. The practical implementation can lead to some little discrepancies, without significantly affecting the motor behavior. Thus, the above requirements must be considered to be satisfied, even if some limited discrepancies are present, due to practical reasons.

BRIEF DESCRIPTION OF THE DRAWINGS

The peculiarities of this invention are further clarified by the attached drawings, wherein.

Figure 1:
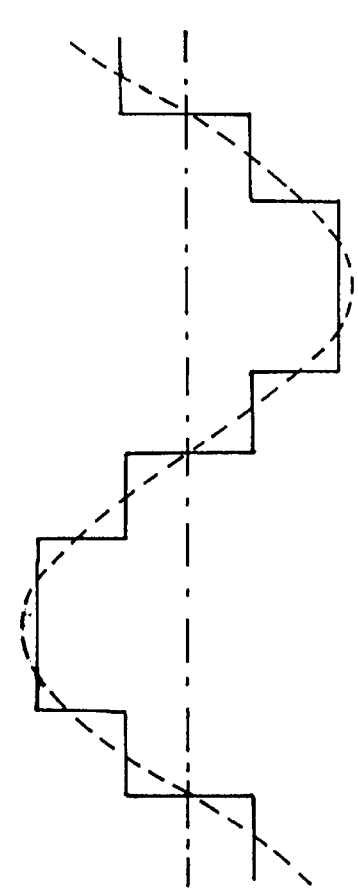
FIG. 1 and FIG. 2 (as already stated) show, for a two-pole motor, two different configurations, both concerning a rotor discretized by eight steps.
Figure 2:
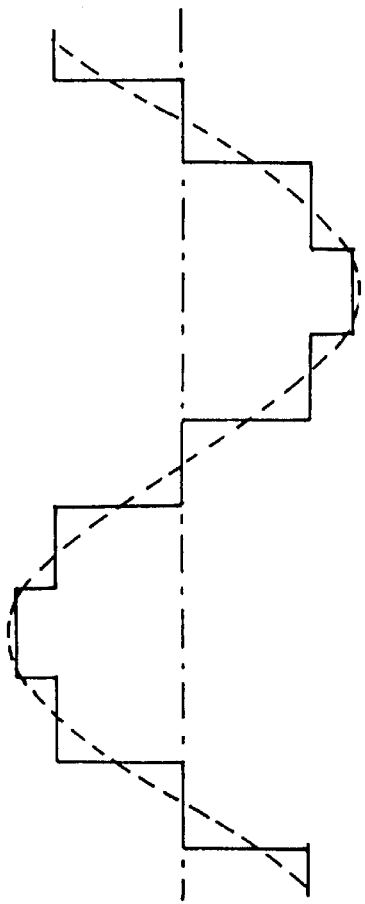
Figure 3:
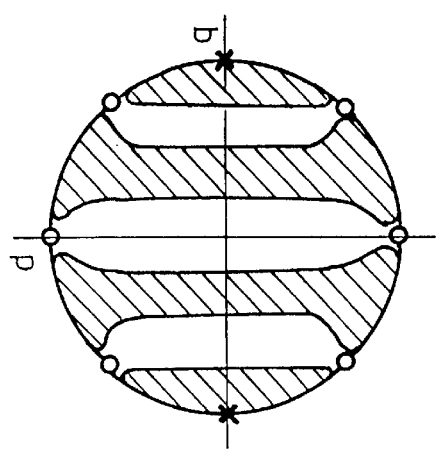
FIG. 3 and FIG. 4 show the behaviour of the rotor magnetic potential in consequence of a q-axis applied m.m.f., with reference to FIG. 1 and to FIG. 2, respectively.
Figure 4:
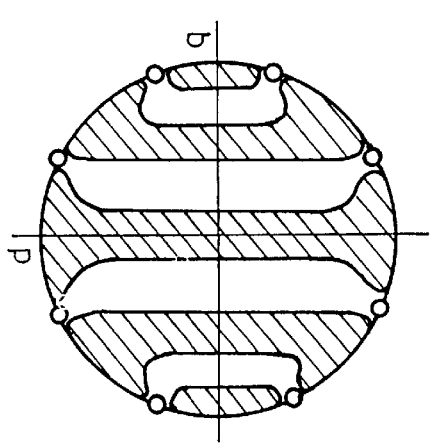

The FIGS. 1 and 2 have already been discussed above.

DESCRIPTION OF THE PREFERRED EMBODIMENTS

Figure 5:
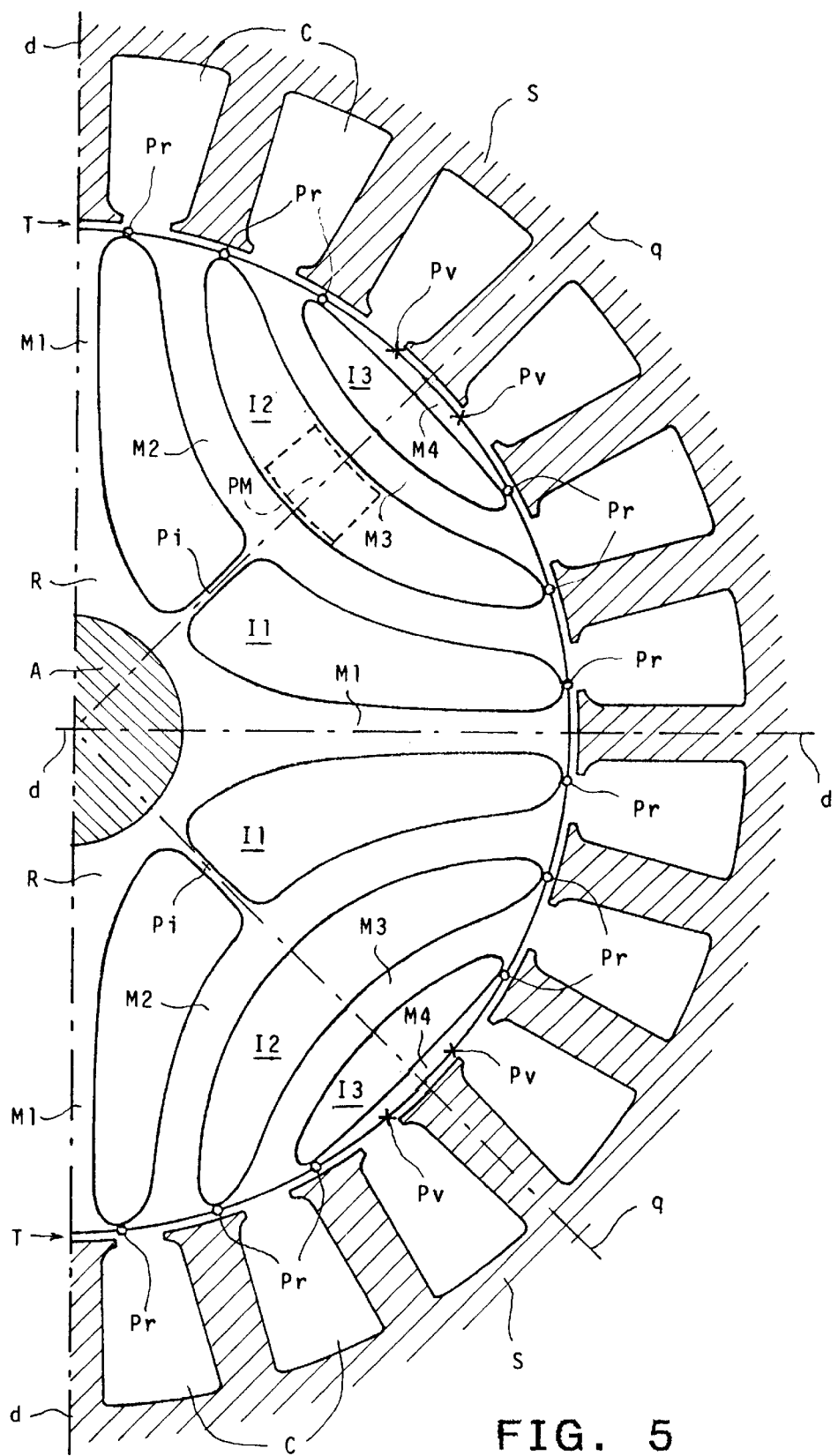
FIG. 5 diagrammatically shows the half-section of a synchronous reluctance motor according to this invention.

By reference to FIG. 5, a four-pole motor is shown (p=2), having a stator S with twelve slots C per pair of poles ($n_s=12$). Inside the stator S, separated by an air gap T (whose width is drawn much larger than real for the purpose of clarity), a rotor R is shown, mounted on a shaft A perpendicular to the drawing plane. The rotor is constituted by a stack of laminations cut in a transverse way, namely, the cutting is done perpendicularly to the drawing plane, and the shown lamination is lying in the drawing plane. Each lamination shows sixteen equivalent ribs (evidenced by crosses or circles) and sixteen rotor pitches ($n_r=16=n_s+4$). The magnetically insulating layers I1, I2, I3, which separate the magnetic segments M1, M2, M3, M4, end in correspondence of these ribs. The real ribs Pr are evidenced by a circle, while the virtual ribs Pv are marked by a cross. These virtual ribs are not physical, but they must be considered in the evaluation of $n_r$, as stated above. They are easily allocated by taking into account the substantial constancy of the rotor pitch. In the shown case, the Pv ribs are virtual because theoretically the segment M4 should have been divided into two very thin segments, separated by an interleaved and also thin non-magnetic layer. This would not be suitable for cutting, of course. It is so shown how, in certain cases, the practical realization cannot exactly follow the theory, however without leading to a relevant difference in the whole shape of the laminations and their behavior. It is also shown in FIG. 5 that layer I1 is interrupted by an additional inner rib Pi. Such ribs can be necessary to ensure mechanical strength. Their physical position is unimportant, from the magnetic point of view. The shown width of the ribs Pi is larger than the real one, for easiness of drawing.

This invention can be applied in an equally profitable way both to synchronous reluctance motors without permanent magnets and to synchronous reluctance motors whose rotors are assisted by permanent magnets. In a manner per se known, such permanent magnets are inserted in the insulating layers, in suitable number and positions, in order that their flux counteracts the flux produced by the q-axis m.m.f. An example of such a permanent magnet is shown at PM in FIG. 5.

The reduction of torque ripple obtained when implementing this invention is quite relevant with respect to the common design practice, wherein $n_s=n_r$. As already told, an exact evaluation of the obtained advantage is difficult, since it depends on the harmonic content of the rotor permeance and on the load conditions. Anyway it can be foreseen that, set to 1 the torque ripple in the case $n_s=n_r$. this invention will lead to a torque ripple not larger than 0.2 to 0.3.

What is claimed is:

1. A synchronous reluctance electrical motor having at least one pair of poles, said motor comprising:

a stator having an even number $n_s$ of slots per pair of poles;

a transverse lamination type rotor having an even number $n_r$ of equivalent slots per pair of poles, and an air gap separating said stator and said rotor, and experiencing torque ripple when rotating, wherein, to minimize the torque ripple, the following relationships are satisfied:

$n_s - n_r \neq 0, +2, -2$; $n_r > 6$; $n_s \neq m \cdot n_r$, m being an integer.

2. A synchronous reluctance electrical motor as set forth in claim 1, wherein between said number $n_s$ of the stator slots and said number $n_r$ of the rotor equivalent slots the following relationship is verified:

$$n_s - n_r = \pm 4.$$

3. A synchronous reluctance electrical motor as set forth in claim 1, wherein said rotor has insulating layers open to said air gap.

4. A synchronous reluctance electrical motor as set forth in claim 1, wherein said rotor has some insulating layers open to said air gap and other insulating layers, said other insulating layers having iron ribs suitable for being magnetically saturated, which close said other insulating layers towards said air gap.

5. A synchronous reluctance electrical motor as set forth in claim 1, wherein said rotor has insulating layers and iron ribs suitable for being magnetically saturated, which traverse some of said insulating layers in intermediate positions thereof.

6. A synchronous reluctance electrical motor as set forth in claim 1, wherein said rotor has rotor layers having constant permeance, whereby a ratio between length and width of each rotor layer is nearly equal for all the rotor layers, in order to avoid producing harmonics capable of interacting with harmonics produced by said stator. capable of interacting with harmonics produced by said stator.

7. A synchronous reluctance electrical motor as set forth in claim 1, wherein said stator slots have openings towards said air gap, and said rotor equivalent slots have mutual distances larger than the width of said stator slot openings, in order to reduce the torque ripple without excessively increasing the iron losses.

8. A synchronous reluctance electrical motor as set forth in claim 1, wherein said rotor is free from the presence of permanent magnets.

9. A synchronous reluctance electrical motor as set forth in claim 1, wherein said rotor has insulating layers, and some permanent magnets are inserted in said insulating layers.

10. A synchronous reluctance electrical motor having at least one pair of poles, said motor comprising:

a stator having an even number $n_s$ of slots per pair of poles;

a transverse lamination type rotor having an even number $n_r$ of equivalent slots per pair of poles, and an air gap separating said stator and said rotor, and experiencing torque ripple when rotating, wherein, to minimize the torque ripple, the following relationships are satisfied:

$n_s - n_r \neq 0, +2, -2$; $n_r > 6$; $n_s \neq m \cdot n_r$, m being an integer, wherein said rotor has insulating layers and iron ribs suitable for being magnetically saturated, which close said insulating layers in a proximity to said air gap.

* * * * *